United States Patent [19]
Pelton et al.

[11] 4,075,099
[45] Feb. 21, 1978

[54] INTEGRAL OIL SUPPLY AND FILTER

[75] Inventors: Peter G. Pelton, Carol Stream; Alan A. Grubman, Glenview; Gary Hasegawa, Morton Grove, all of Ill.

[73] Assignee: The Continental Group, Inc., New York, N.Y.

[21] Appl. No.: 602,074

[22] Filed: Sept. 2, 1975

[51] Int. Cl.² .............................................. F01M 1/02
[52] U.S. Cl. ............................ 210/168; 123/196 A; 184/6.13; 184/6.24; 210/172; 210/443
[58] Field of Search .................. 123/196 R, 196 A; 184/1.5, 6, 6.13, 6.24; 210/168, 171, 194, 43 F, 437, 440–446, 457, 472, 232, 233, 172

[56] References Cited

U.S. PATENT DOCUMENTS

| | | | |
|---|---|---|---|
| 1,380,276 | 5/1921 | Ward | 184/6.13 X |
| 2,088,243 | 7/1937 | Koinzan | 210/436 X |
| 2,373,360 | 4/1945 | Walsh | 184/6.13 |
| 2,469,025 | 5/1949 | Aldham | 210/232 X |
| 2,976,864 | 3/1961 | Ford | 210/168 X |
| 3,380,593 | 4/1968 | Uhen et al. | 210/444 X |
| 3,539,009 | 11/1970 | Kudlaty | 210/436 X |
| 3,774,769 | 11/1973 | Smith | 210/445 X |

*Primary Examiner*—William A. Cuchlinski, Jr.
*Attorney, Agent, or Firm*—Diller, Brown, Ramik & Wight

[57] ABSTRACT

This disclosure relates to a novel container assembly wherein oil required for the changing of oil of a unit, such as an internal combustion engine, may be packaged in a readily disposable container and wherein the container has built thereinto the usual filter so that in a simple operation both the filter and old oil may be removed as a unit.

10 Claims, 6 Drawing Figures

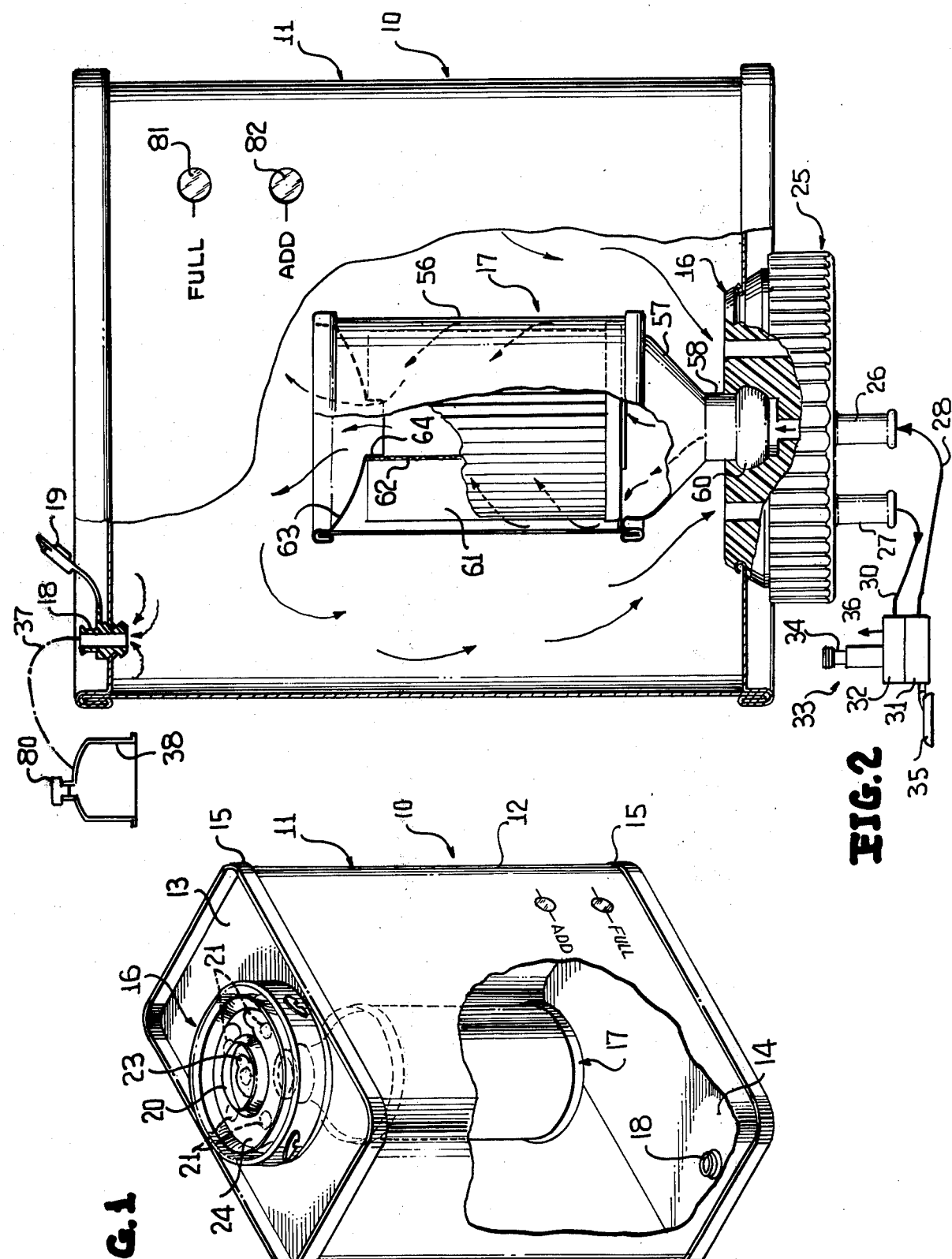

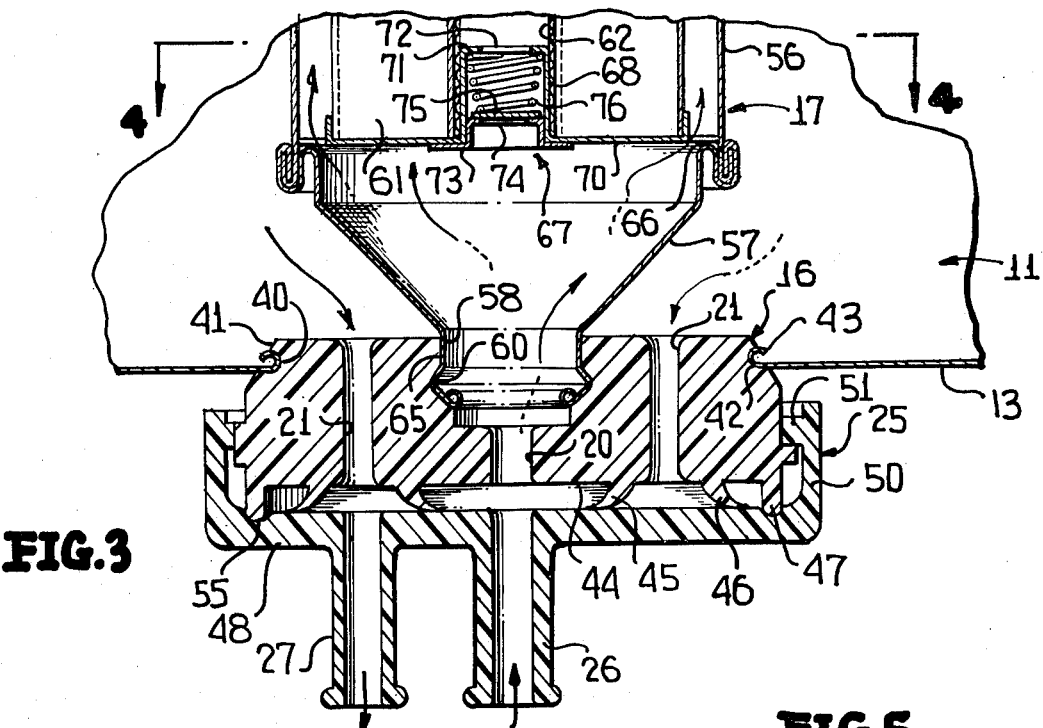
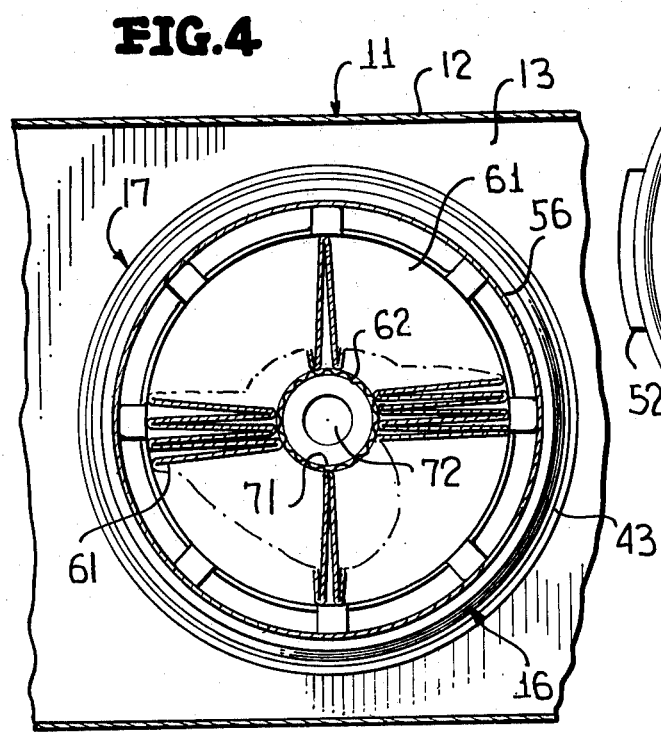
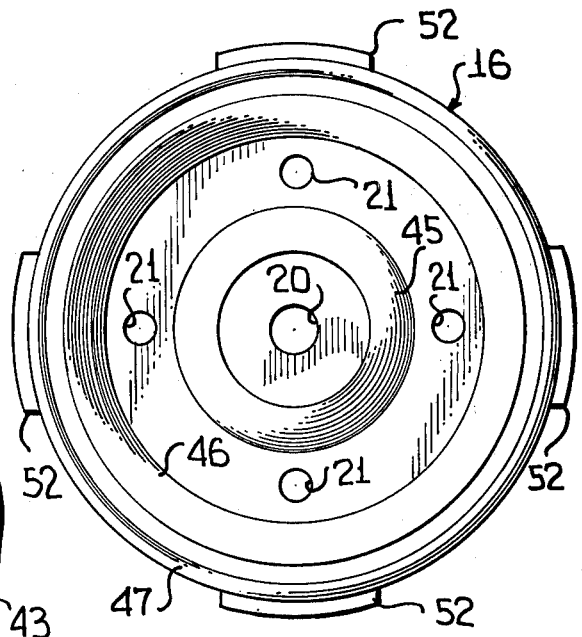

INTEGRAL OIL SUPPLY AND FILTER

This invention relates in general to new and useful improvements in containers, and more particularly to a container for a supply of oil wherein the container is of a disposable construction and has incorporated therein a filter for automatically cleansing the oil as it is recirculated. The container is provided with means for coupling the same to existing units requiring lubrication.

In the customary internal combustion engine, the lower portion of the block is enclosed within an oil pan in which the oil for the lubrication of the engine is stored and into which the circulated oil drains. Mounted in the lower part of the engine and having a pick up within a sump portion of the oil pan is the usual oil pump. The oil pump pumps the necessary oil into the engine block, through a full flow filter, and then back into the engine block for circulation through the engine.

The above system has several disadvantages. The primary disadvantage is the inclusion of air in the oil being circulated. Oil has a great affinity for air and as a result, a can of oil received from a consumer has on the average of approximately 18% air. When that same oil is circulated through an internal combustion engine, it is sprayed and otherwise mixed with air with the result that a very large amount of air is absorbed in the oil returning to the oil pan. Further, inasmuch as the oil supplied to the oil pump is withdrawn thereinto, which results in the incorporation of further air into the oil, oil circulated through an internal combustion engine has an undesirable percentage of air which greatly reduces the lubrication and bearing supporting properties of the oil.

For the above reason, certain internal combustion engines are provided with a dry sump system wherein the oil collected in the oil pan is pumped therefrom to a suitable collector wherein air may be removed from the oil and from which oil is supplied under gravity pressure to the pressure pump of the engine. In other engines, an adequate supply of oil cannot be maintained internally in a conventional oil pan or other portion of the crankcase. This is particularly true with respect to radial or inverted aircraft engines. In these various engine arrangement the oil supply is retained externally.

It is also pointed out here that with the usual oil pan construction, it is necessary to provide a relatively deep sump so as to assure that oil will be available at all times for lubrication purposes even though the quantity of oil available is diminished. The sump of the average oil pan depends on the order of 4 inches below the portion of the oil pan which is utilized only as a cover. As a result, the internal combustion engine must be mounted 4 inches higher than is normally required in order to provide clearance for the sump portion of the oil pan.

A further disadvantage of present automotive constructions is that the usual screw-on oil filter is so positioned that it is extremely difficult to remove. There was a time when the average service station would replace an oil filter, as part of the oil change, only for the price of the oil filter. Today an extra charge is made for changing the oil filter.

In accordance with the foregoing, it is proposed that internal combustion systems and other units requiring lubrication be constructed with a dry sump, but in lieu of the presently expensive external tank construction, as well as the present difficult to remove oil filter, there be provided a simple container construction which has mounted therein as an integral part thereof an oil filter. The container would be of a construction which would facilitate the utilization thereof as a carrier and storage area for the oil prior to incorporation thereof as part of a lubrication system and would be of a conventional container construction so that the cost thereof would be such that it could be disposed of. Thus, when one is ready to make the customary oil change on the internal combustion engine or other machinery, one would merely disconnect the container with the used oil therein and replace the container with a new container full of clean oil. Inasmuch as the container would be mounted in the upper part of the engine compartment of a vehicle, and in the case of other type of machinery in a readily accessible position, the necessary change over could be readily accomplished.

With the above and other objects in view that will hereinafter appear, the nature of the invention will be more clearly understood by reference to the following detailed description, the appended claims and the several views illustrated in the accompanying drawings:

IN THE DRAWINGS:

FIG. 1 is a top perspective view of an oil supply unit formed in accordance with this invention with portions thereof broken away.

FIG. 2 is an enlarged side view of the oil supply unit of FIG. 1 in its position of use and shows the same coupled to internal combustion engine components, portions being broken away and shown in section.

FIG. 3 is an enlarged fragmentary vertical sectional view taken through the lower portion of the supply unit of FIG. 2 and shows more specifically the details of construction thereof.

FIG. 4 is an enlarged fragmentary horizontal sectional view taken along the line 4—4 of FIG. 3 and shows further the constructional details of the unit.

FIG. 5 is an enlarged plan view of a fitting incorporated in th container of the oil supply unit.

FIG. 6 is a fragmentary side elevational view of the fitting and shows further the constructional details thereof.

Referring now to the drawings in detail, reference is first made to FIG. 1 wherein there is illustrated an oil supply unit formed in accordance with this invention, the supply unit being generally designated by the numeral 10. The oil supply unit 10 includes a conventional container, generally identified by the numeral 11 which would have the shape of a normal rectangular or round can for liquids, such as the one gallon or two gallon size customarily found in the marketplace. The container 11 includes a container body 12 which has secured to the opposite ends thereof end closures 13 and 14 by means of conventional double seams 15.

The end closure 13 is provided with a fitting, generally identified by the numeral 16, which is particularly adapted for the circulation therethrough of oil in a manner to be described hereinafter. Carried by the fitting 16 and projecting into the interior of the container 11 is a filter, generally identified by the numeral 17. Further, the end closure 14 is provided with a vent fitting 18 to be described hereinafter.

It is to be understood that when the container 11 is initially being utilized as a carrier and storage place for oil, it will normally be stored in the upright position illustrated in FIG. 1. The vent fitting 18 will be provided with a tamper-proof seal suitable closure 18, which may be of the snap-on type integrally connected to the fitting 18.

As will be described in more detail hereinafter, the fitting 16 is provided with a central opening 20 and outer openings 21. These openings may be sealed by means of a disposable closure cap (not shown) or by means of removable sealing strips 23 and 24 which will be described in more detail hereinafter. If desired, a single sealing member may be used and secured to the hereinafter to be described ring 47.

Reference is now made to FIG. 2 wherein the oil supply unit 10 is illustrated in an oil system of an internal combustion engine. The container 11 has been inverted from its position of FIG. 1 and will be seated in a suitable support carried by the associate vehicle in much the same manner as a battery is mounted in such vehicle or perhaps even more simple in the manner in which the conventional windshield wiper bottle is mounted. The details of such a support are not part of this invention, and therefore, are not specifically described here.

In order to facilitate the utilization of oil stored within the container 11, as well as the recirculation of oil therethrough, it is necessary that the internal combustion engine or other unit the lubrication system of which the oil supply unit 10 forms a part, be provided with an adapter, generally identified by the numeral 25, which is releaseably secured to the fitting 16. The adapter 25, among other features, includes an inlet tube 26 and an outlet tube 27 which are connected by means of hoses 28 and 30, respectively, to a scavenger pump 31 and a pressure pump 3. The pumps 31 and 32 are illustrated as being parts of a single double unit pump, generally identified by the numeral 33 and having a single drive shaft 34. The scavenger pump 31 has associated therewith a conventional oil pick up 35 and the pressure pump 32 is adapted to discharge into the engine block as indicated by the arrow 36.

When the oil supply unit 10 is part of a internal combustion engine, the vent fitting 18 will be coupled by means of a line 37 to some portion of the internal combustion engine in which the air vapors may be dissipated without the loss of oil, such as a valve cover 38.

It is to be understood that when the oil of the oil system requires changing, the line 37 is disconnected and the vent fitting 18 is closed. The container 11 is then lifted from its support and is then inverted to the position shown in FIG. 1, after which the adapter 25 may be removed from the fitting 16. If a closure cap is supplied, the closure cap may be reapplied and now the dirty oil is in a self-contained package which may be disposed of in any convenient manner, including the pouring of the oil from the container 11 through the vent fitting 18.

Inasmuch as the oil supply unit 10 will be mounted in a convenient position within the vehicle or adjacent to the machinery of which the lubrication system is a part, it will be readily apparent that the oil of the lubrication system may be quickly and readily changed by an unskilled person with no or a minimal loss of oil.

Reference is now made to FIGS. 2, 3, 5 and 6 wherein the specific details of the fitting 16 and the relationship thereof to the container 11 and the adapter 25 is illustrated. The fitting 16 is preferably formed of a firm, but resilient plastic material and is inserted into an opening 40 formed in the end closure 15 as a plug. Preferably the inner portion of the fitting 16 is tapered as at 41 with the tapered portion having an annular groove 42 formed therein. The opening 40 in the closure is formed as a curl 43 of a diameter corresponding to the diameter of the groove 42 so that there may be a snap, sealed interlock between the end closure 13 and the fitting 16.

As previously described, the fitting 16 is provided with a central opening which defines an inlet passage for the container 11. The opening 20 opens through an end wall 44 of the fitting 16 which faces away from the container 11. The end wall 44 has integrally formed thereon an annular sealing ring 45 which projects from the end wall 44 is surrounding relation with respect to the opening 20. The sealing ring 45 is of a tapered construction and when axially compresses, deflects so as to form a secure seal with the opposing surface.

As is also previously described, the fitting 16 is provided with a plurality of openings 21 therethrough which define outlet passages. The openings 21 are formed in the fitting 16 outwardly of the sealing ring 45 and radially outwardly of the openings 21 is a second sealing ring 46 which is of the same construction as the sealing ring 45, but which is particularly adapted so as to deflect radially outwardly as opposed to the radially inward deflection of the sealing ring 45. It will be apparent from FIG. 3 that the openings 21, which form the outlet passages, open through the end 44 of the fitting 16 between the sealing rings 45 and 46.

The end wall 44 of the fitting 16 is provided with a third and outer sealing ring 47 which is relatively stiff with respect to flexure and movement thereof is primarily restricted to axial compression.

As previously described, the adapter 25 is provided with tubes or projections 26 and 27. It is to be noted that these are particularly constructed for the reception of hoses capable of withstanding pressure. The hose fittings 26, 27 project from an end wall 48 of a cup shaped body of the fitting 25 which also includes a skirt portion 50. The skirt portion 50 is of a size to telescope over the fitting 16 and is provided with a plurality of circumferentially spaced lugs 51. The lugs 51 cooperate with similar circumferentially spaced projections 52 formed on the periphery of the fitting 16, which projections 52 each includes a camming surface 53 terminating in a locking recess 54, as best shown in FIG. 6. It is to be understood that the adapter 25 is telescoped over the fitting 16 with the lugs 51 passing between the projections 52. The fitting 16 and the adapter 25 are turned relative to each other with the lugs 51 passing under the projections 52 in engagement with the cam surfaces 53 until they drop into the slots 54. At this time the adapter 25 is tightly locked with the fitting 16.

As is clearly shown in FIG. 3, when the adapter 25 is properly engaged with the fitting 16, the sealing ring 45 is deflected in tight engagement with the wall 48 of the adapter to form a seal so as to prevent the escape of oil passing into the fitting 26 of the adapter 25 and the inlet passage 20. In a like manner, the sealing ring 46 is in tight sealing engagement with the inner face of the wall 48 so as to make certain that all fluid passing out through the outlet passages 21 will pass through the fitting 27 of the adapter 25 without the loss of oil. Finally, the sealing ring 47 is seated in an annular groove 55 in the wall 48 and forms a final seal against the escape of oil under pressure from between the fitting 16 and the adapter 25.

Reference is now made to the specific construction and mounting of the filter 17. In accordance with this invention, it is preferred that the construction of the filter 17 incorporate the details of can body contruction so that the filter may be made at a minimum cost. Accordingly, the filter 17 includes a body member 56 which is in the form of a conventional can body. One end of the can body 56, the lower end in FIG. 2, is closed by a conventional conical end unit 57 generally of the soft drinking beverage type including a neck 58 having an enlargement 60 on the terminal end portion thereon for receiving a closure cap.

A conventional filter element 61 is placed within the can body 56, the filter element being of the type wherein the material to be filtered flows therethrough in a radial direction from the exterior thereof into the interior with the interior being defined by a perforated hollow tube 62.

The upper end of the can body 56, as shown in FIG. 2, is closed by a further end unit 63. The end units 57 and 63 are secured to the can body 56 by conventional double seaming. It is to be noted that the end unit 63 projects into the interior of the can body 56 and terminates in a tubular portion 64 which is telescoped within the tube portion 62 and is sealed relative thereto so as to prevent the escape of fluid around the filter element 61.

It is to be understood that the filter 17 is to be carried by the fitting 16. In order to facilitate the assembly of the filter 17 with the fitting 16, the fitting 16 is provided with a contoured bore 65 which forms a continuation of the inlet passage 20. The bore 65 is so contoured that the neck 58 and the enlargement 60 of the end unit 57 will snap into the fitting 16 in positive interlocking relation.

Further with reference to FIG. 3, it will be seen that the end unit 57 projects into the can body 56 and is reversely folded therein as at 66 so as to define a shoulder on which the filter element 61 rests. Thus, the filter element 61 may be firmly clamped between the two end closures 57 and 63.

It is also pointed out here that normally the lower end of the tube 62 will be closed. However, inasmuch as all of the oil of the system must flow through the filter 17, in the event the filter element 61 should become clogged or for some other reason unable to pass the full flow of the oil from the scavenger pump 31, it is desirable that there be a pressure bypass means to compensate for this condition. The pressure bypass means is generally identified by the numeral 67 and is mounted in the lower end of the tube 62, as illustrated in FIG. 3. The pressure bypass means 67 includes a sleeve portion 68 of an end wall 70 of the filter element 61 which projects into the tube 62 in sealed relation and which has an end wall 71 within the tube 62, the end wall 71, in turn, having an oil passage 72 therethrough.

The lower end of the sleeve 68 is closed by a hat shaped member 73 having an oil passage 74 therethrough. A check valve 75 is normally held against the hat shaped member 73 by a spring 76 enclosed as the oil passage 74.

Although a specific valve assembly has been specifically illustrated and described herein, it is understood that any type of check valve assembly may be provided and that the check valve assembly could be mounted at various locations such as on the scavenger pump discharge or on the end closure 57 as opposed to being carried by the filter element 61.

OPERATION

Assuming that it is necessary to change the oil of the lubrication system of which the oil unit 10 is a part, the vent line 37 is removed and the vent fitting 18 is closed by the application of the closure element. Then the old oil unit 10 is lifted out of its support (not shown) and inverted, after which the adapter 25 is removed therefrom and a suitable closure member (not shown) to be supplied with a new oil unit, will eventually be applied to the fitting 16 so as to seal the passages therein. The old oil unit is now ready for disposal although it is preferred that the oil contained therein be drained at a convenient point for the purpose of salvaging the oil. The new oil unit 10, after the seals for the inlet passage 20 and the outlet passages 21 have been removed, has the adapter 25 attached thereto, after which it is inverted and placed in the support from which the old oil unit was removed. The vent fitting 18 is now open and the vent line 37 attached thereto.

It will be readily apparent that once the container 11 has been vented, the oil therein is free to run through the outlet passages 21 down to the pressure pump 32 so that the same is immediately primed. The unit, such as an internal combustion engine, is then started with the pressure pump 32 supplying the oil under pressure and the scavenger pump 31 serving to pick up the returning oil and returning the same to the oil unit 10 with all of the oil passing first through the filter 17 and then into the interior proper of the container 11 for return to the pump 32.

It is to be noted that the utilization of the oil unit 10 has advantages other than the replacement of the oil of the unit which is being lubricated. First of all, all oil that passes to the pressure pump 32 is clean oil and does not contain metal fragments, etc. which could damage the pressure pump. Therefore, the pressure pump will have a long life and will continue to maintain the necessary pressure for the unit which is being lubricated. It is acknowledged that the scavenger pump 31 will have directed thereinto the dirty oil including metal and other foreign particles, but the scavenger pump does not have to operate at a high pressure, and therefore, minor damages thereto may be sustained without sufficiently deteriorating from its function.

A further advantage of a use of a scavenger pump and the exterior oil supply is that when the oil passes through the filter 17 and expands within the container 11, as it reverses its flow in the top portion of the container, large quantities of undesirable air entrained therein will be released and this air will be drawn out of the system through the vent line 37. As a result, the quantity of air in the oil being circulated through the lubrication passages of the unit being lubricated will be greatly reduced. Further, since the pressure pump 32 is gravity pressure fed as opposed to suction fed, there will be a less tendency of air being drawn into the pressure pump. This also reduces the quantity of entrained air being pumped through the system. Inasmuch as the air has no lubrication value and greatly detracts from the lubrication properties of oil under pressure in a friction type bearing assembly, the removal of the air can be a major factor.

At this time it is pointed out that in the event the supply of oil has to be added to before the normal oil change is required, oil may be added in the normal manner, such as through a fitting 80 on the valve cover 38. In order to determine whether oil should be added, the container 11 may be provided with suitable sight openings 81 and 82 as is deemed advisable.

It is to be understood that the container body 12 may be provided with suitable lithography. This may include instructions as to how to install and utilize the oil unit 10.

Although only a preferred embodiment of the lubrication system and oil unit has been specifically illustrated and described herein, it is to be understood that minor variations may be made therein without departing from the spirit and scope of the invention, as defined by the appended claims.

What is claimed as new:

1. A new article of manufacture comprising a disposable oil unit for a dry sump lubricating system, said oil unit including a disposable container of a construction suitable for transporting oil, said container being of a size to be the primary oil storage area for an intended machine, a fitting carried by said container, said fitting defining an inlet passage for directing oil into said container, a filter, said filter being small in size as compared to said container, coupling means coupling said filter to said fitting for receiving oil through said inlet passage, said filter having a discharge opening into said container, and means for delivering oil from said container for passage through a unit to be lubricated, said means for delivering oil from said unit including said fitting defining an outlet passage, said fitting having an end face remote from said container, said inlet passage being generally centrally located and said end face having projecting therefrom a first sealing ring, said end face having a second sealing ring projecting therefrom surrounding said fist sealing ring, and said outlet passage being disposed between said sealing rings.

2. The oil unit of claim 1 wherein said end face has projecting therefrom a third and outermost sealing ring, said first and second sealing rings being sidewise deflectable and said third sealing ring being endwise deformable.

3. The oil unit of claim 2 wherein said fitting has associated therewith a removable adapter having inlet and outlet oil line fittings, and connecting means releasing securing said adapter to said fitting in sealing ring compressing relation whereby effective seals are formed between said fitting and said adapter.

4. The oil unit of claim 1 wherein a first sealing element is removably secured to said fitting within said first sealing ring and closes said inlet passage, and a second sealing element is removably secured to said fitting between said sealing rings and closes said outlet passage.

5. A new article of manufacture comprising a disposable oil unit for a dry sump lubricating system, said oil unit including a disposable container of a construction suitable for transporting oil, said container being of a size to be the primary oil storage area for an intended machine, a fitting carried by said container, said fitting defining an inlet passage for directing oil into said container, a filter, said filter being small in size as compared to said container, coupling means coupling said filter to said fitting for receiving oil through said inlet passage, said filter having a discharge opening into said container, and means for delivering oil from said container for passage through a unit to be lubricated, said filter including an imperforate housing, a filter means within said housing, end closures on said housing, and said coupling means including cooperating means on one of said end closures and said fitting.

6. The oil unit of claim 5 wherein said housing is a conventional can body and said end closures are end units seamed to end portions of said can body.

7. The oil unit of claim 5 wherein said one end closure is a conventional conical end unit, and said cooperating means includes the customary closure cap projection on said one end closure.

8. The oil unit of claim 5 wherein said filter includes a pressure bypass relief means for effecting the bypassing of said filter element in the case of excess oil pressure.

9. A lubrication system comprising a scavenger pump, a pressure pump and an external oil unit, said oil unit including a container intended to be disposable and of a construction suitable for the customary transporting and storage of oil prior to use of the oil, a fitting carried by said container and defining an inlet passage and an outlet passage, an adapter unit releaseably connected to said fitting and connecting said inlet passage to said scavenger pump for receiving circulated oil therefrom and said outlet passage to said pressure pump for delivering oil thereto, and a filter in said container and coupled to said fitting for receiving oil through said inlet passage and filtering the same prior to flow thereof into said container.

10. The lubrication system of claim 9 wherein said container in use includes an upper portion, and vent means are carried by said upper portion for removing air liberated from oil flowing into said container.

* * * * *